(12) United States Patent
Ruelland et al.

(10) Patent No.: US 10,323,755 B2
(45) Date of Patent: Jun. 18, 2019

(54) KNIFE GATE VALVE

(71) Applicant: OxO Fab Inc., Saguenay (CA)

(72) Inventors: Frédéric Ruelland, Saguenay (CA);
Clément Simard, Saguenay (CA)

(73) Assignee: OxO Fab Inc., Saguenay, Québec (CA)

( * ) Notice: Subject to any disclaimer, the term of this patent is extended or adjusted under 35 U.S.C. 154(b) by 0 days.

(21) Appl. No.: 16/071,738

(22) PCT Filed: Jan. 20, 2017

(86) PCT No.: PCT/CA2017/050063
§ 371 (c)(1),
(2) Date: Jul. 20, 2018

(87) PCT Pub. No.: WO2017/124192
PCT Pub. Date: Jul. 27, 2017

(65) Prior Publication Data
US 2019/0032794 A1 Jan. 31, 2019

Related U.S. Application Data

(60) Provisional application No. 62/286,026, filed on Jan. 22, 2016.

(51) Int. Cl.
*F16K 3/02* (2006.01)
*F16K 27/04* (2006.01)

(52) U.S. Cl.
CPC .......... *F16K 3/0281* (2013.01); *F16K 3/0227* (2013.01); *F16K 27/044* (2013.01)

(58) Field of Classification Search
CPC ..... F16K 3/0227; F16K 3/0281; F16K 27/044
See application file for complete search history.

(56) References Cited

U.S. PATENT DOCUMENTS 3,341,170 A    9/1967    Housworth
4,332,271 A *   6/1982    Rohr .................... F16K 27/0218
                                                                                    137/315.22

(Continued)

FOREIGN PATENT DOCUMENTS

CN       202901317 U     4/2013
DE        4446946 C1 *   9/1996           F16K 27/044

(Continued)

OTHER PUBLICATIONS

Int'l Search Report and Written Opinion dated Apr. 6, 2017 in Int'l Application No. PCT/CA2017/050063.

(Continued)

*Primary Examiner* — Marina A Tietjen
(74) *Attorney, Agent, or Firm* — Panitch Schwarze Belisario & Nadel LLP

(57) ABSTRACT

A knife gate valve including a knife valve gate, a gate actuation mechanism, operatively connected to the knife valve gate, a two-part sleeve and a valve body. The two-part sleeve includes an upstream section and a downstream section with the knife valve gate being selectively insertable therebetween. The valve body includes an upper casing section and a lower casing section pivotally connected to one another. The upper casing section and the lower casing section each include a concave cavity together defining a sleeve receiving channel of the valve body. The two-part sleeve is removably engageable in the sleeve receiving channel. The upper casing section and the lower casing section are pivotable between an operative configuration preventing removal of the two-part sleeve from the sleeve receiving channel and a maintenance configuration allowing insertion and removal of the two-part sleeve from the sleeve receiving channel.

21 Claims, 11 Drawing Sheets

(56) References Cited

U.S. PATENT DOCUMENTS

| | | | |
|---|---|---|---|
| 5,014,730 A | 5/1991 | Fye | |
| 5,236,003 A | 8/1993 | Habicht | |
| 5,388,807 A * | 2/1995 | Habicht | F16K 1/2263 |
| | | | 251/305 |
| 5,865,210 A | 2/1999 | Fort | |
| 7,165,789 B2 * | 1/2007 | Burian | F16K 27/0218 |
| | | | 285/112 |
| 2014/0332707 A1 | 11/2014 | Reilly et al. | |
| 2016/0327198 A1 * | 11/2016 | Sundrla | F16K 3/0281 |

FOREIGN PATENT DOCUMENTS

| | | | | |
|---|---|---|---|---|
| JP | 2014129862 A | | 7/2014 | |
| WO | WO-2012172552 A2 * | 12/2012 | | F16K 27/0218 |

OTHER PUBLICATIONS

Int'l Preliminary Report on Patentability dated Jul. 24, 2018 in Int'l Application No. PCT/CA2017/050063.

* cited by examiner

KNIFE GATE VALVE

CROSS REFERENCE TO RELATED APPLICATION

This application is a Section 371 of International Application No. PCT/CA2017/050063, filed Jan. 20, 2017, which was published in the English language on Jul. 27, 2017 under International Publication No. WO 2017/124192 A1, which claims the benefit under 35 U.S.C. § 119(e) of U.S. provisional patent application No. 62/286,026, which was filed Jan. 22, 2016, the entirety of the aforementioned applications are incorporated herein by reference.

TECHNICAL FIELD OF THE INVENTION

The present invention relates to the field of industrial valves. More precisely, the present invention relates to a knife gate valve where the components and design favors faster replacement of a sleeve of the valve on site (i.e. without displacement of the valve body).

BACKGROUND

Knife gate valves are a specific type of gate valve where a knife gate with a beveled edge can be moved in and out of a path of a fluid, to selectively allow or prevent the flow of the fluid. Knife gate valves are commonly used in industrial applications to control the flow of fluid containing solid or semi-solid particles, such as powder, granules, pellets, fibers or the like. For example, knife gate valves are frequently used in papermaking, mining, chemical and sewage treatment industries.

In order to facilitate the maintenance thereof, knife gate valves are commonly equipped with a two-part replaceable sleeve in which the fluid flows, with the knife gate being moved between the two-parts thereof to selectively allow or prevent the fluid flow. Hence, the two-part replaceable sleeve, which is usually the component that is subject to the greatest wear due to abrasion resulting from the fluid flow, can be replaced when required.

Known knife gate valves however tend to suffer from several drawbacks. For example and without being limitative, with known knife gate valves, the maintenance associated to the replacement of the two-part replaceable sleeve is a time consuming process. Hence, such maintenance leads to substantially significant maintenance periods (representing downtime of the knife gate valve), as the knife gate valve commonly needs to be dismounted from a site and moved to a workshop to proceed with sleeve replacement. Such substantially significant maintenance periods lead to significant maintenance costs associated to the replacement of the sleeve, for example taking into account the salary of the worker and the loss of productivity resulting from the downtime of the knife gate valve.

In view of the above, there is a need for an improved knife gate valve which, by virtue of its design and components, would be able to overcome or at least minimize some of the above-discussed prior art concerns.

BRIEF SUMMARY OF THE INVENTION

In accordance with a first general aspect, there is provided a knife gate valve. The knife gate valve comprises a knife valve gate and a gate actuation mechanism operatively connected to the knife valve gate. The knife gate valve also comprises a removable two-part sleeve including an upstream section and a downstream section each having a tubular body, the knife valve gate being selectively insertable between the upstream section and the downstream section thereof. The knife gate valve further comprises a valve body including an upper casing section and a lower casing section pivotally connected to one another. The upper casing section and the lower casing section each include a concave cavity delimited by a concave cavity delimiting surface and together define a sleeve receiving channel of the valve body. The removable two-part sleeve is removably engageable in the sleeve receiving channel. The upper casing section and the lower casing section are pivotable between an operative configuration preventing removal of the removable two-part sleeve from the sleeve receiving channel and a maintenance configuration allowing insertion and removal of the removable two-part sleeve from the sleeve receiving channel.

In an embodiment, the knife gate valve further comprises a sleeve compression assembly configured to press sleeve mating ends of the upstream section and the downstream section of the two-part sleeve towards one another when the upper casing section and the lower casing section are configured in the operative configuration.

In an embodiment, the sleeve compression assembly comprises a sleeve engaging groove extending inwardly from the concave cavity delimiting surface in at least one of the upper casing section and the lower casing section, the sleeve engaging groove defining at least one lip engaging surface. The sleeve compression assembly also comprises an inner lip extending radially from the tubular body of at least one of the upstream section and the downstream section of the two-part sleeve, the inner lip including an engagement surface engageable to a corresponding one of the at least one lip engaging surface defined by the sleeve engaging groove and being insertable in the sleeve engaging groove when the upper casing section and the lower casing section are configured in the operative configuration, the sleeve mating ends of the upstream section and the downstream section of the two-part sleeve being pressed towards one another when the inner lip is inserted in the sleeve engaging groove.

In an embodiment, each one of the upper casing section and the lower casing section comprises an upstream wall and a downstream wall, the sleeve engaging groove being defined between the upstream wall and the downstream wall of the at least one of the upper casing section and the lower casing section.

In an embodiment, the at least one lip engaging surface defined by the sleeve engaging groove is inwardly beveled.

In an embodiment, the sleeve engaging groove comprises two opposed lip engaging surfaces being inwardly beveled.

In an embodiment, an inner lip extends radially from the tubular body of each one of the upstream section and the downstream section of the two-part sleeve, the inner lip being positioned at the sleeve mating ends of each one of the upstream section and the downstream section of the two-part sleeve.

In an embodiment, the engagement surface of the inner lip is inwardly beveled.

In an embodiment, the tubular body of the upstream section and the downstream section of the two-part sleeve comprises an outer lip extending radially from the tubular body at a body engaging end, the outer lip being superposable to an outer surface of the upper casing section and the lower casing section when the upper casing section and the lower casing section are configured in the operative configuration.

In an embodiment, the knife gate valve further comprises a sleeve engagement assembly maintaining the two-part sleeve in engagement with one of the upper casing section and the lower casing section when the upper casing section and the lower casing section are configured in the maintenance configuration.

In an embodiment, the sleeve engagement assembly comprises complementary abutting shoulders respectively defined in the cavity delimiting surface of the upper casing section and in the outer surface of the tubular body of the upstream section and the downstream section of the two-part sleeve.

In an embodiment, the knife gate valve further comprises a locking mechanism configured to lock the upper casing section and the lower casing section together in the operative configuration.

In an embodiment, the knife gate valve further comprises a movement restraint assembly configured to dampen the pivoting movement between the upper casing section and the lower casing section when they are pivoted regarding one another.

In an embodiment, the knife gate valve comprises a pivot between the upper casing section and the lower casing section and the movement restraint assembly comprises a spring-loaded mechanism dampening the movement of the pivot.

In an embodiment, the knife gate valve further comprises a push rod assembly including push rods selectively extendable from an outer surface of the valve body and retractable therein.

In accordance with another general aspect, there is provided a knife gate valve. The knife gate valve comprises a two-part sleeve, a knife valve gate, a gate actuation mechanism and a valve body. The two-part sleeve comprises an upstream section and a downstream section, each having a tubular body, and defines a pathway for fluid flow. The knife valve gate is configurable between an open configuration where it is located away from the pathway and a closed configuration where it extends across the pathway. The gate actuation mechanism is operatively connected to the knife valve gate to move the knife valve gate between the open configuration and the closed configuration. The valve body comprises an upper casing section and a lower casing section pivotally connected to one another and pivotable between an operative configuration and a maintenance configuration. The upper casing section and the lower casing section are configured to receive the two-part sleeve therebetween. The two-part sleeve is securely maintained between the upper casing section and the lower casing section, with the pathway being substantially sealed, when the upper casing section and the lower casing section are configured in the operative configuration. The two-part sleeve is partially disengaged from one of the upper casing section and the lower casing section and is substantially unsealed when they are configured in the maintenance configuration.

In an embodiment, the upper casing section and the lower casing section each include a concave cavity delimited by a concave cavity delimiting surface and together define a sleeve receiving channel of the valve body, the two-part sleeve being removably engageable in the sleeve receiving channel.

In an embodiment, the knife gate valve further comprises a sleeve compression assembly configured to press sleeve mating ends of the upstream section and the downstream section of the two-part sleeve towards one another when the upper casing section and the lower casing section are configured in the operative configuration.

In an embodiment, the sleeve compression assembly comprises a sleeve engaging groove extending inwardly from the concave cavity delimiting surface in at least one of the upper casing section and the lower casing section, the sleeve engaging groove defining at least one lip engaging surface. The sleeve compression assembly also comprises an inner lip extending radially from the tubular body of at least one of the upstream section and the downstream section of the two-part sleeve, the inner lip including an engagement surface engageable to a corresponding one of the at least one lip engaging surface defined by the sleeve engaging groove and being insertable in the sleeve engaging groove when the upper casing section and the lower casing section are configured in the operative configuration. The sleeve mating ends of the upstream section and the downstream section of the two-part sleeve are pressed towards one another when the inner lip is inserted in the sleeve engaging groove.

In an embodiment, each one of the upper casing section and the lower casing section comprises an upstream wall and a downstream wall. The sleeve engaging groove is defined between the upstream wall and the downstream wall of the at least one of the upper casing section and the lower casing section.

In an embodiment, the at least one lip engaging surface defined by the sleeve engaging groove is inwardly beveled.

In an embodiment, the sleeve engaging groove comprises two opposed lip engaging surfaces being inwardly beveled.

In an embodiment, the inner lip extends radially from the tubular body of each one of the upstream section and the downstream section of the two-part sleeve. The inner lip is positioned at the sleeve mating ends of each one of the upstream section and the downstream section of the two-part sleeve.

In an embodiment, the engagement surface of the inner lip is inwardly beveled.

In an embodiment, the tubular body of the upstream section and the downstream section of the two-part sleeve comprises an outer lip extending radially from the tubular body at a body engaging end, the outer lip being superposable to an outer surface of the upper casing section and the lower casing section when the upper casing section and the lower casing section are configured in the operative configuration.

In an embodiment, the knife gate valve further comprises a sleeve engagement assembly maintaining the two-part sleeve in engagement with one of the upper casing section and the lower casing section when the upper casing section and the lower casing section are configured in the maintenance configuration.

In an embodiment, the sleeve engagement assembly comprises complementary abutting shoulders respectively defined in the cavity delimiting surface of the upper casing section and in the outer surface of the tubular body of the upstream section and the downstream section of the two-part sleeve.

In an embodiment, the knife gate valve further comprises a locking mechanism configured to lock the upper casing section and the lower casing section together in the operative configuration.

In an embodiment, the knife gate valve further comprises a movement restraint assembly configured to dampen the pivoting movement between the upper casing section and the lower casing section when they are pivoted regarding one another.

In an embodiment, the knife gate valve comprises a pivot between the upper casing section and the lower casing section and the movement restraint assembly comprises a spring-loaded mechanism dampening the movement of the pivot.

In an embodiment, the knife gate valve further comprises a push rod assembly including push rods selectively extendable from an outer surface of the valve body and retractable therein.

In accordance with another general aspect, there is provided a knife gate valve. The knife gate valve comprises a valve gate, a valve gate actuation mechanism operatively connected to the valve gate, a removable sleeve and a valve body. The removable sleeve comprises an upstream section and a downstream section, each having a tubular body. The valve body comprises an upper casing and a lower casing pivotally connected to one another and defining a sleeve receiving channel therebetween. The removable sleeve is removably engageable in the sleeve receiving channel. The upper casing and the lower casing are pivotable between an operative configuration preventing removal of the removable sleeve from the sleeve receiving channel and a maintenance configuration allowing insertion and removal of the removable sleeve from the sleeve receiving channel.

In an embodiment, the knife gate valve further comprises a sleeve compression assembly configured to compress the upstream section and the downstream section of the sleeve towards one another during the transition between the maintenance configuration and the operative configuration.

In an embodiment, each one of the upper casing and the lower casing comprises an upstream wall and a downstream wall, each having a semi-circular opening. The semi-circular openings of the upstream wall and downstream wall of the upper and the lower casings defining together the sleeve receiving channel. The sleeve compression assembly comprises: an inner lip extending radially from the tubular body of the upstream section and the downstream section of the sleeve; and a sleeve engaging groove defined in the semi-circular opening of each one of the upstream and downstream wall of at least one of the upper casing and the lower casing. Each sleeve engaging groove is configured to receive therein a section of the inner lip of a corresponding one of the upstream section and the downstream section of the sleeve when the upper casing and the lower casing are configured in the operative configuration. At least one of the sleeve engaging groove of the semi-circular opening of the at least one of the upper casing and the lower casing is angled inwardly.

In an embodiment, the tubular body of the upstream section and the downstream section of the sleeve comprises an outer lip extending radially from the tubular body at a body engaging end. The outer lip is superposable to an outer surface of the upper casing and the lower casing when the upper casing and the lower casing are configured in the operative configuration.

In an embodiment, an external conduit is securable to the valve body and the sleeve compression assembly is further configured to perform further compression of the upstream section and the downstream section of the sleeve upon securing the external conduit to the valve body.

In an embodiment, the knife gate valve further comprises a sleeve engagement assembly retaining the sleeve in engagement with one of the upper casing and the lower casing when the upper casing and the lower casing are configured in the maintenance configuration.

In an embodiment, the knife gate valve further comprises a sealing assembly sealing the valve body when the upper casing and the lower casing are configured in the operative configuration.

In an embodiment, the knife gate valve further comprises a locking mechanism configured to lock the upper casing and the lower casing together in the operative configuration.

In an embodiment, the locking mechanism comprises a tab mounted to one of the upper casing and the lower casing and a handle mounted to the other one of the upper casing and the lower casing and being engageable with the tab.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
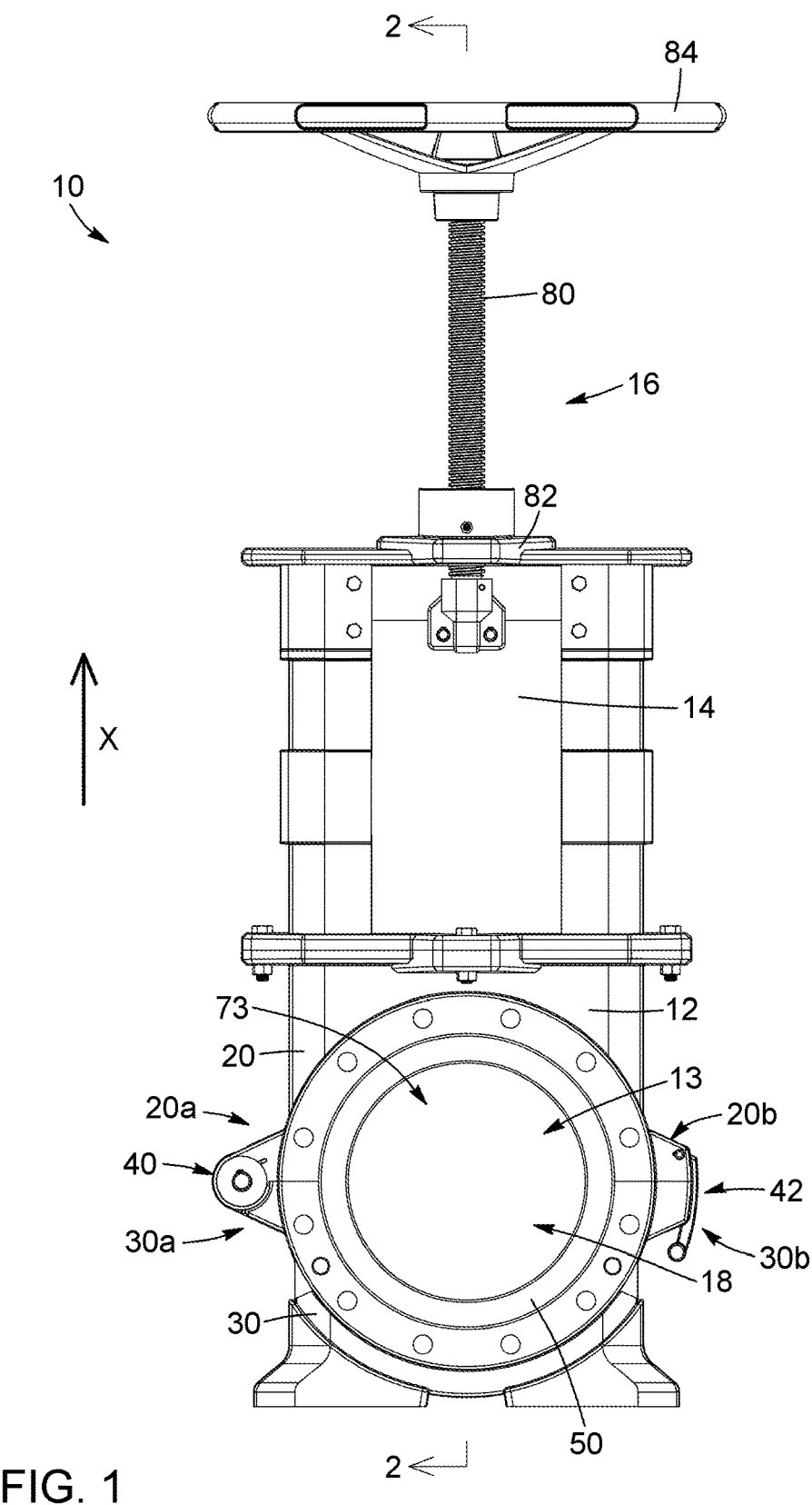
FIG. 1 is a front elevation view of a knife gate valve according to an embodiment, wherein the knife gate valve is shown with an upper casing section and a lower casing section configured in an operative configuration and a knife valve gate configured in an open configuration.
Figure 2:
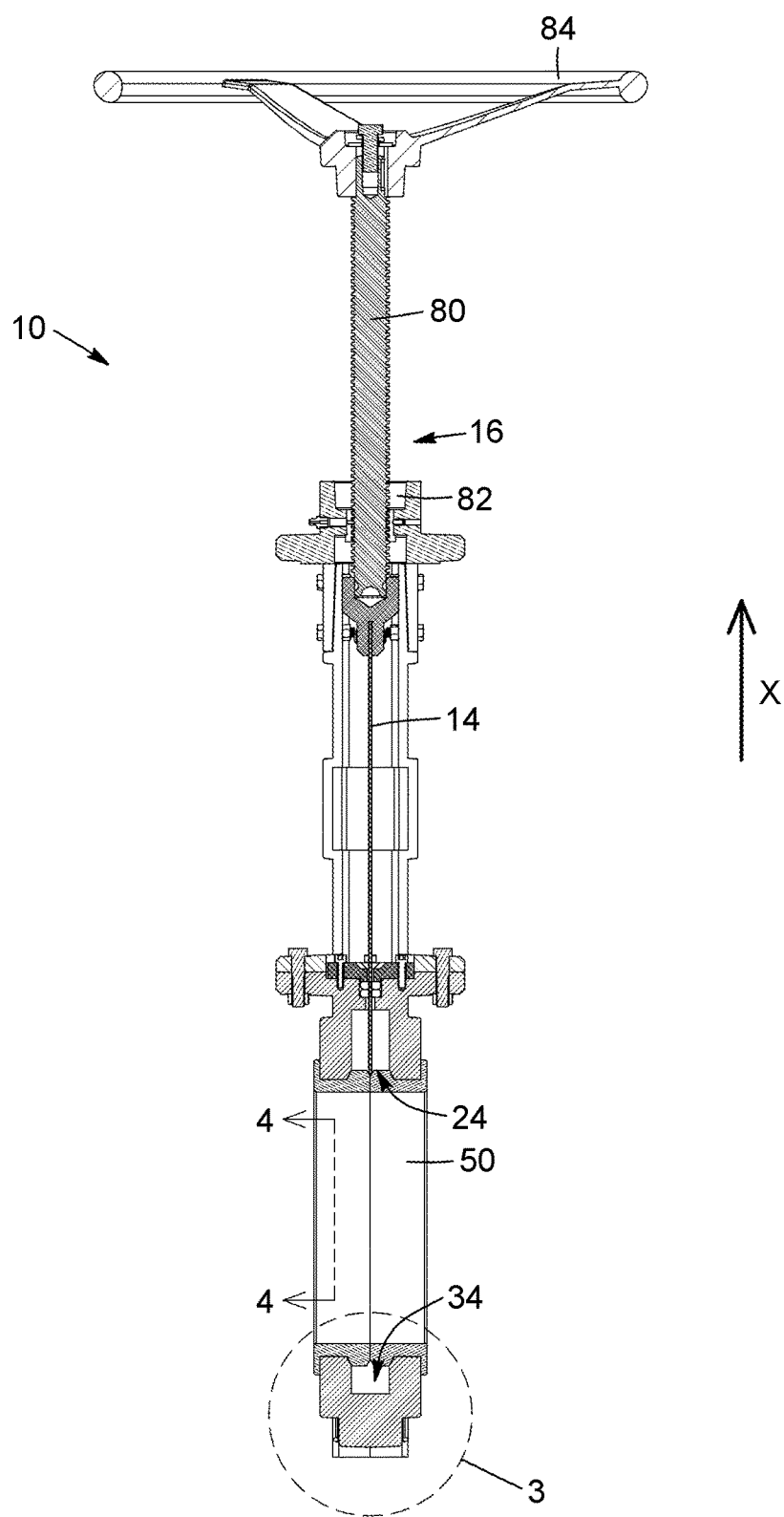
FIG. 2 is a cross sectional view of the knife gate valve of FIG. 1, taken along lines 2-2 in FIG. 1.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the knife gate valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the knife gate valve, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Referring generally to FIGS. 1 to 7C, there is shown a knife gate valve 10 in accordance with an embodiment. The knife gate valve 10 has a valve body 12 with a sleeve receiving channel 13 extending therethrough, a knife valve gate 14 slidably mounted to the valve body 12, a gate actuation mechanism 16 operatively connected to the knife valve gate 14 and a removable two-part sleeve 50 engageable with the valve body 12, in the sleeve receiving channel 13, as will be described in more details below. In the embodiment shown, the valve body 12 includes an upstream wall (or flange) 70 and a downstream wall (or flange) 72 each having an aperture 73 defined therein to define the sleeve receiving channel 13 extending continuously between the upstream wall 70 and the downstream wall 72. The upstream wall 70 and the downstream wall 72 are connected by side walls 74 extending therebetween. One skilled in the art will understand that, in alternative embodiments, other arrangements or designs than the embodiment shown can also be used to define the valve body 12.

With reference to FIGS. 1 to 9, in the embodiment shown, the two-part sleeve 50 is insertable in the sleeve receiving channel 13 of the valve body 12 and engageable to the valve body 12, to define a pathway 18 for fluid flow. The two-part sleeve 50 includes an upstream section 52 and a downstream section 54, each having a tubular body 56, with a body engaging end 64 and a sleeve mating end 66. The tubular bodies 56 of the upstream section 52 and the downstream section 54 of the two-part sleeve 50 together define the pathway 18 extending through the valve body 12 to allow the flow of fluid therethrough. In other words, the tubular bodies 56 of the upstream section 52 and the downstream section 54 of the two-part sleeve 50 together define an inner passage which forms the pathway 18 through which process media flows. In the embodiment shown, the tubular bodies 56 of the upstream section 52 and the downstream section 54 of the two-part sleeve 50 are substantially cylindrical, thereby defining a substantially cylindrical pathway 18. The two-part sleeve 50 is made of resilient material. For example and without being limitative, in an embodiment, the two-part sleeve 50 can be made of natural rubber, synthetic rubber (e.g. EPDM rubber, NBR rubber, etc.) or other elastomer being used in abrasive and/or corrosive applications.

The knife valve gate 14 is movable inside the valve body 12, transversally to the pathway 18, between an open configuration (shown in FIG. 1) where the knife valve gate 14 is located outside of the pathway 18 and allows the flow of fluid therethrough and a closed configuration (not shown) where the knife valve gate 14 extends across the pathway 18 and prevents the flow of fluid therethrough. In an embodiment, the knife valve gate 14 is substantially movable along a vertical axis X and selectively insertable between the upstream section 52 and the downstream section 54 of the two-part sleeve 50. The gate actuation mechanism 16 is operatively connected to the knife valve gate 14, to move the knife valve gate 14 between the above-described open configuration and closed configuration.

In the embodiment shown, the gate actuation mechanism 16 includes a rotatable shaft 80, rotatable with regards to the valve body 12 for actuation of the knife valve gate 14. The rotatable shaft 80 is screwable in a shaft receiving member 82, such as without being limitative a screwing plate integral to the valve body 12 or mounted thereto. In an embodiment, the shaft receiving member 82 is positioned at an upper end of the valve body 12. The rotatable shaft 80 has a lower end operatively connected to the knife valve gate 14 and an upper end operatively connected to a hand wheel 84, such that the rotatable shaft 80 can be rotated through operation of the hand wheel 84. Rotation of the hand wheel 84 in a first direction (e.g. in a clockwise direction) results in the rotatable shaft 80 being screwed in the shaft receiving member 82 and consequently in a downward movement of the knife valve gate 14 (i.e. towards the closed configuration). Rotation of the hand wheel 84 in a second direction, opposed to the first direction, (e.g. in a counterclockwise direction) results in the rotatable shaft 80 being unscrewed from the shaft receiving member 82 and consequently in an upward movement of the knife valve gate 14 (i.e. towards the open configuration). One skilled in the art will understand that, in alternative embodiments (not shown), the gate actuation mechanism 16 can comprise a mechanism different from the embodiment shown for actuating the knife valve gate 14 between the open configuration and the closed configuration.

Figure 7A:
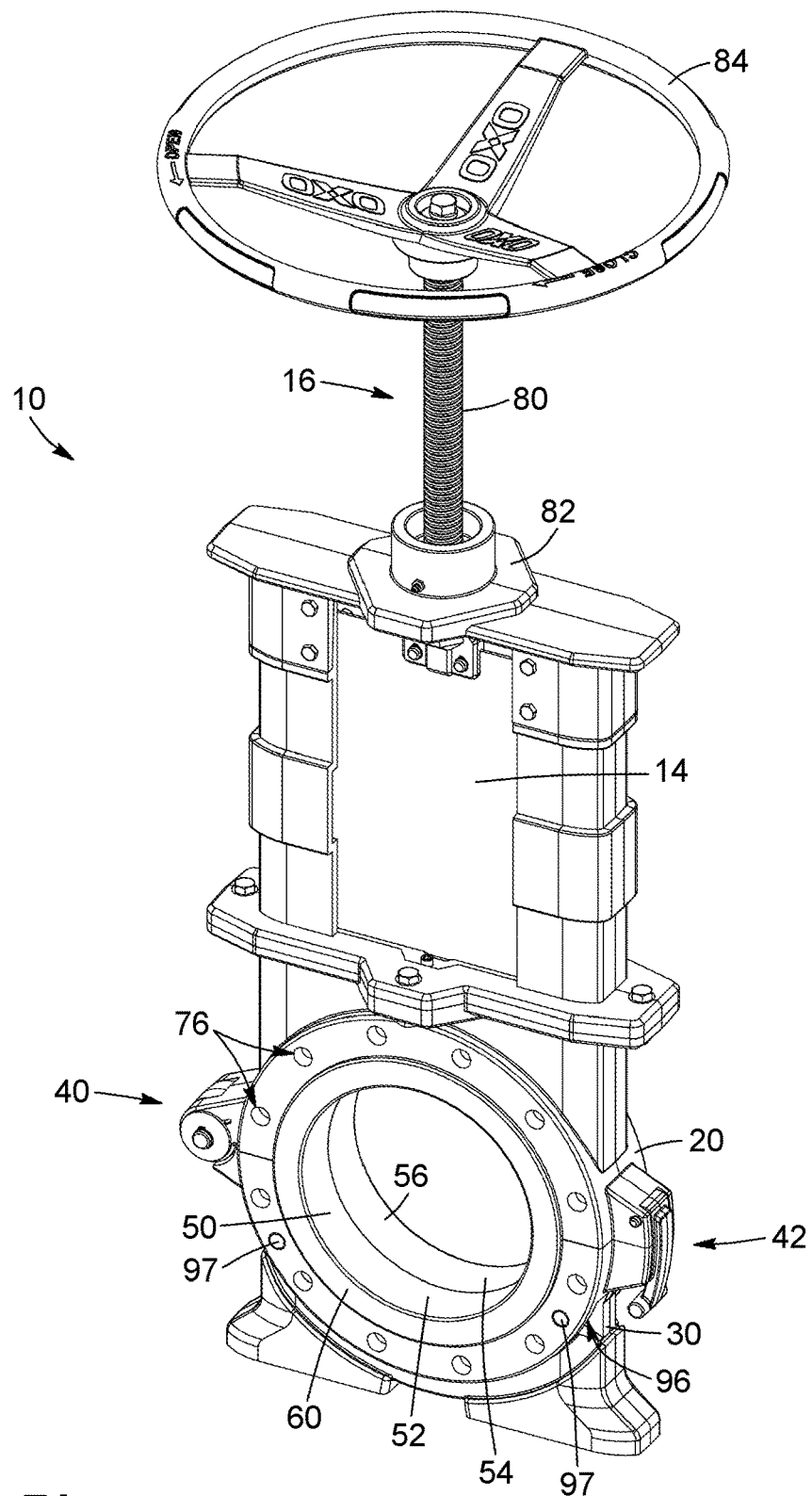
FIG. 7A is a perspective view of the knife gate valve of FIG. 1.
Figure 7B:
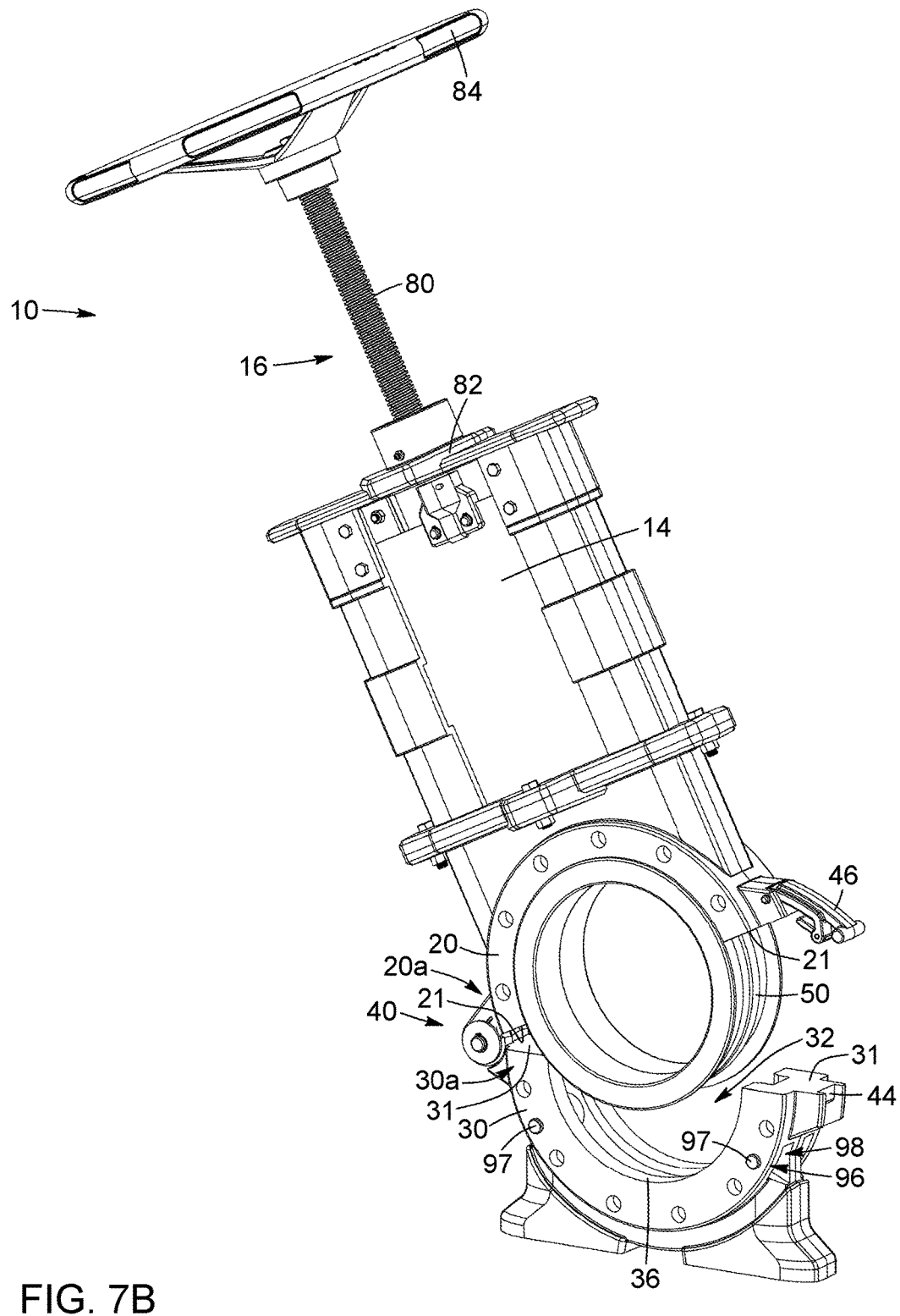
FIG. 7B is a perspective view of the knife gate valve of FIG. 1, wherein the knife gate valve is shown with the upper casing section and the lower casing section configured in a maintenance configuration and with the sleeve engaged to the upper casing section.
Figure 7C:
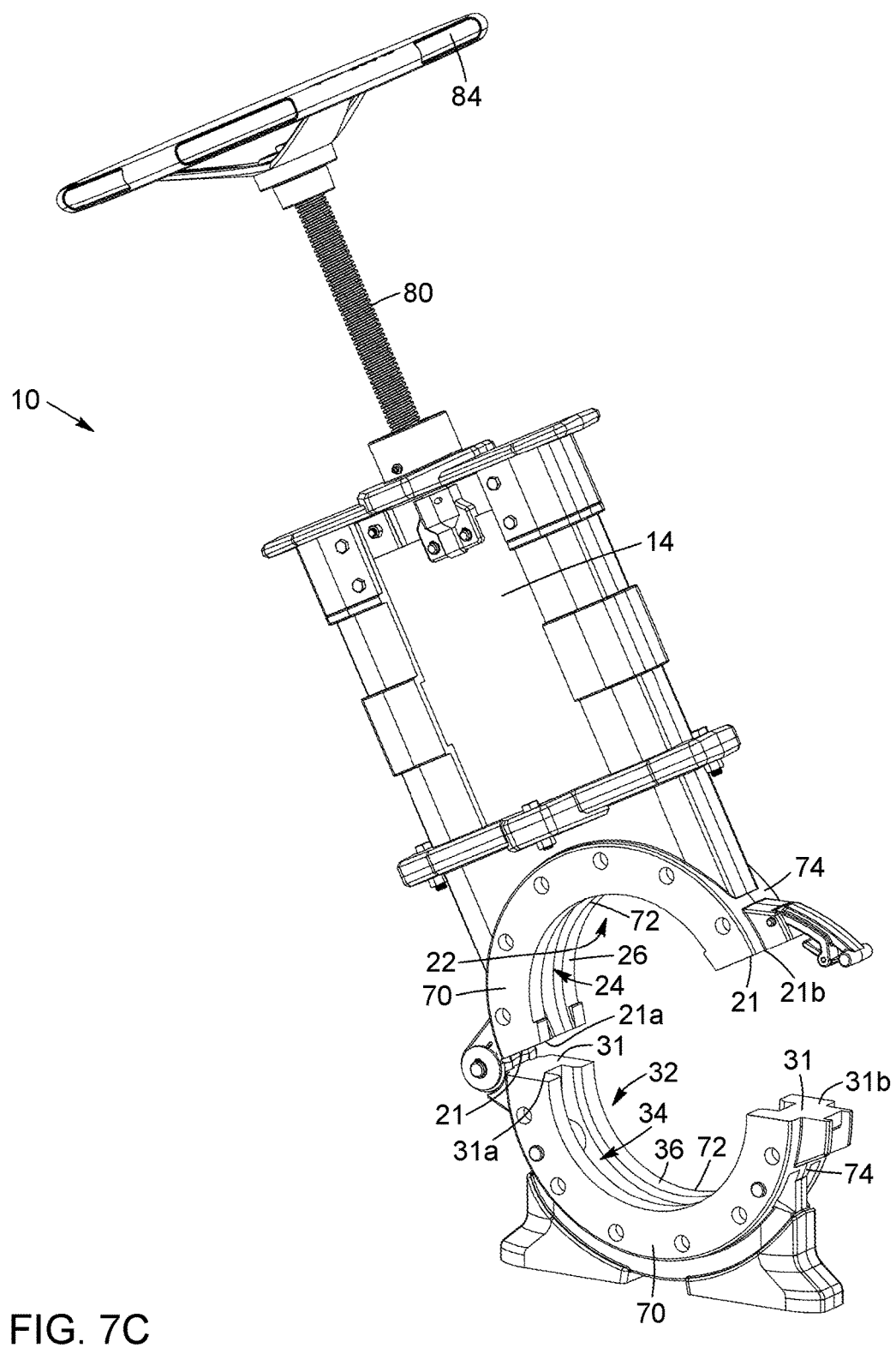
FIG. 7C is a perspective view of the knife gate valve of FIG. 1, wherein the knife gate valve is shown with the upper casing section and the lower casing section configured in a maintenance configuration and with the sleeve removed.

Referring to FIGS. 7A to 7C, to favor the replacement of the two-part sleeve 50, the valve body 12 is divided into an upper casing section (or upper jaw) 20 and a lower casing section (or lower jaw) 30, each having a pivotal end 20a, 30a and a locking end 20b, 30b. The upper casing section 20 and lower casing section 30 also each have engagement surfaces 21, 31 extending inwardly from the respective one of the pivotal end 20a, 30a and locking end 20b, 30b of the upper casing section 20 and lower casing section 30 and being located respectively at the lower end of the upper casing section 20 and an upper end of the lower casing section 30. The engagement surfaces 21, 31 of the upper casing section 20 and lower casing section 30 are substantially parallel to one another to be superposed when the upper casing section 20 and the lower casing section 30 are engaged in an operative configuration, which will be described in more details below. In the embodiment shown, the engagement surfaces 21, 31 are discontinuous, each one of the engagement surfaces 21, 31 including a pivoting end section 21a, 31a and a locking end section 21b, 31b.

Each one of the upper casing section 20 and the lower casing section 30 also comprises a concave cavity (or opening) 22, 32 extending inwardly in the respective one of the upstream wall 70 and the downstream wall 72, from the corresponding one of the engagement surfaces 21, 31. The concave cavities 22, 32 are defined by a concave cavity delimiting surface 26, 36, extending between the pivoting end section 21a, 31a and locking end section, 21b, 31b of the respective ones of the engagement surfaces 21, 31. The concave cavities 22, 32 cooperate to define the apertures 73 in the upstream wall 70 and the downstream wall 72, which form the sleeve receiving channel 13 of the valve body 12 when the upper casing section 20 and the lower casing section 30 are engaged in the operative configuration, which will be described in more details below. In the embodiment shown, the concave cavities 22, 32 are semi-circular cavities, for receiving the cylindrical tubular bodies 56 of the upstream section 52 and the downstream section 54 of the two-part sleeve 50.

To favor the replacement of the two-part sleeve 50 of the valve 10, the upper casing section 20 and the lower casing section 30 are pivotally connected to one another at their pivotal ends 20a, 30a by a pivot (or hinge) 40. The pivotal connection between the upper casing section 20 and the lower casing section 30 allows pivoting of the upper casing section 20 and the lower casing section 30 about one another, to move the same between the above-mentioned operative configuration (shown in FIG. 7A) and a maintenance configuration (shown in FIGS. 7B and 7C). When the upper casing section 20 and the lower casing section 30 are configured in the operative configuration (see FIG. 7A), they are engaged to one another such that the pivoting end section 21a, 31a and the locking end section, 21b, 31b of the engagement surfaces 21, 31 abut one another (i.e. the engagement surfaces 21, 31 of the upper casing section 20 and the lower casing section 30 abut one another at the pivotal end 20a, 30a and the locking end 20b, 30b thereof). When the upper casing section 20 and the lower casing section 30 are configured in the maintenance configuration (see FIGS. 7B and 7C), they are pivoted away from one another such that the engagement surfaces 21, 31 of the upper casing section 20 and the lower casing section 30 are separated (or distal) from each other, with the engagement surfaces 21, 31 thereof being spaced apart from one another of a greater distance at the locking end 20b, 30b than at the pivotal end 20a, 30a.

In an embodiment, the concave cavities 22, 32 are adapted to receive and engage the two-part sleeve 50 such as to firmly maintain the sleeve 50 in place when the upper casing section 20 and the lower casing section 30 are configured in the operative configuration. Hence, the valve body 12 is configured to prevent removal of the two-part sleeve 50 from the sleeve receiving channel 13 when the upper casing section 20 and the lower casing section 30 are configured in the operative configuration. In other words, when the upper casing section 20 and the lower casing section 30 are configured in the operative configuration, the two-part sleeve 50 is surrounded and securely maintained between the upper casing section 20 and the lower casing section 30 and cannot be removed from the valve body 12 for replacement thereof (See FIG. 7A). In addition, as will be described in more details below, when the upper casing section 20 and the lower casing section 30 are configured in the operative configuration, the sleeve mating ends 66 of the tubular body 56 of the upstream section 52 and the downstream section 54 of the two-part sleeve 50 are pressed against one another to define a substantially sealed pathway 18 and thereby prevent fluid leak between the upstream section 52 and the downstream section 54 of the two-part sleeve 50.

Conversely, when the upper casing section 20 and the lower casing section 30 are configured in the maintenance configuration, the two-part sleeve 50 engaged to the valve body 12 is easily accessible and can be inserted/removed from the sleeve receiving channel 13 for replacement thereof (see FIG. 7B). In the embodiment shown, in the maintenance configuration, a section of the two-part sleeve 50 is in engagement with the upper casing section 20 and a section of the two-part sleeve is disengaged therefrom and accessible to workers for removal. When the upper casing section 20 and the lower casing section 30 are configured in the maintenance configuration, no pressure is required between the sleeve mating ends 66 of the tubular body 56 of the upstream section 52 and the downstream section 54, given that no fluid flows therethrough (i.e. through the pathway 18) when the valve 10 is configured in this configuration. In fact, in an embodiment, in the maintenance configuration, the upstream section 52 and the downstream section 54 are disengaged, or spaced apart from one another, to facilitate the withdrawal of the upstream section 52 and the downstream section 54 of the two-part sleeve 50 from the concave cavities 22, 32 of the corresponding one of the upper casing section 20 and the lower casing section 30 defining the valve body 12. Hence, in an embodiment, when the upper casing section 20 and the lower casing section 30 are configured in the maintenance configuration, the pathway 18 defined by the two-part sleeve 50 is substantially unsealed.

Figure 4:
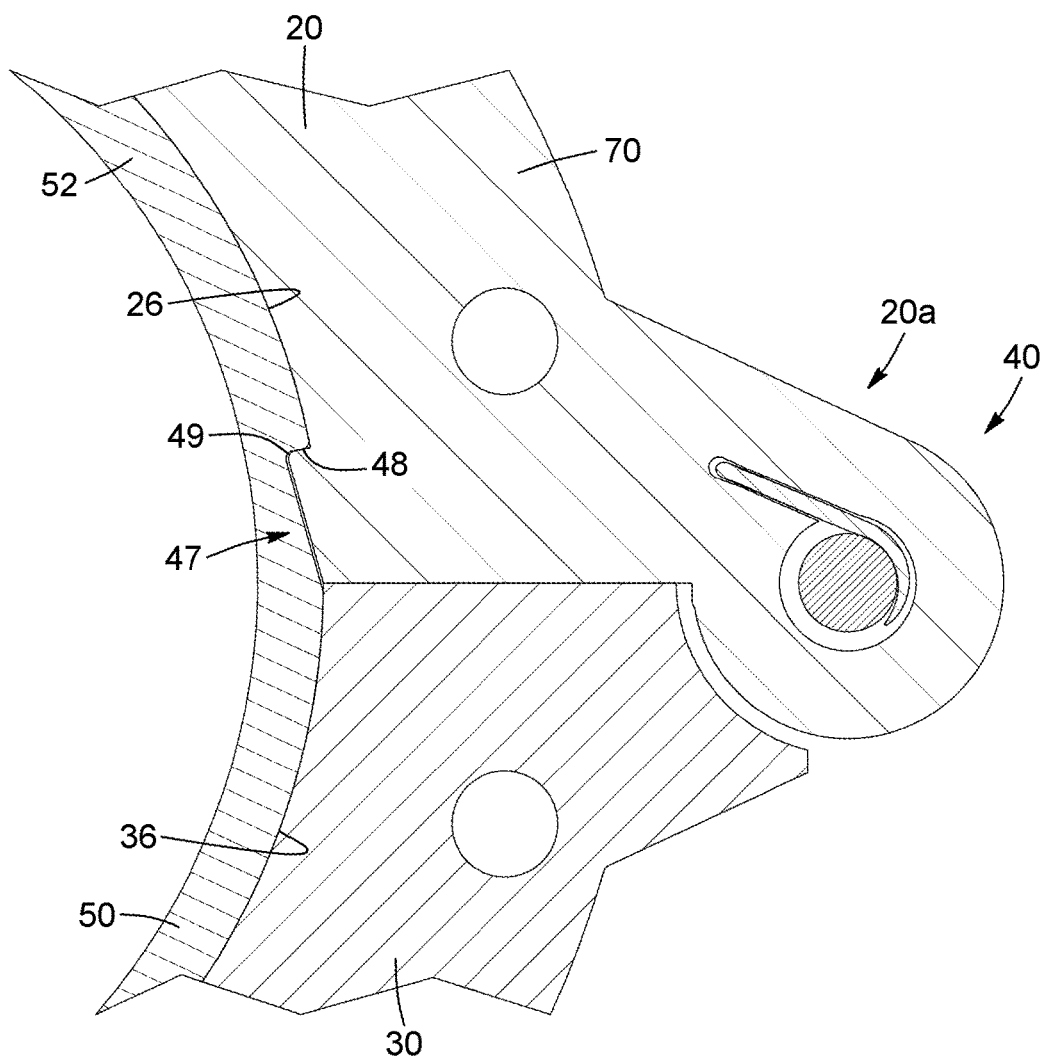
FIG. 4 is a cross sectional view of a section of the knife gate valve of FIG. 1, taken along lines 4-4 in FIG. 2.
Figure 5:
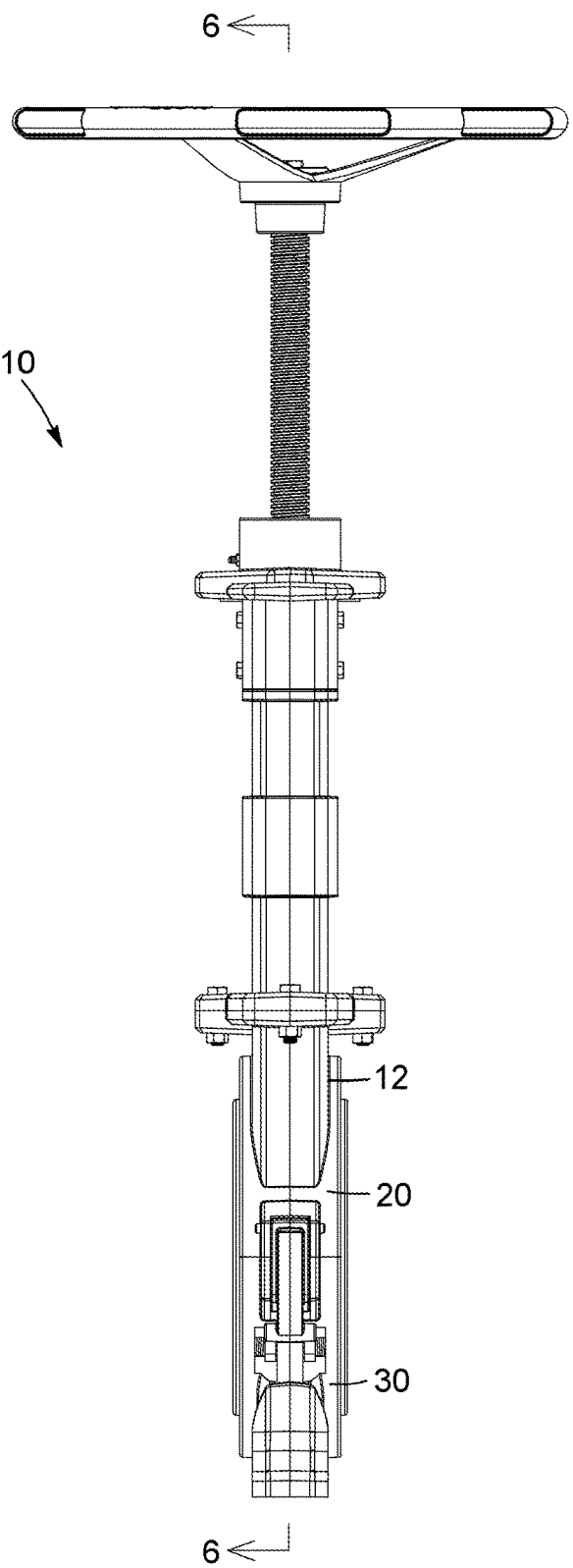
FIG. 5 is a side elevation view of the knife gate valve of FIG. 1.
Figure 6:
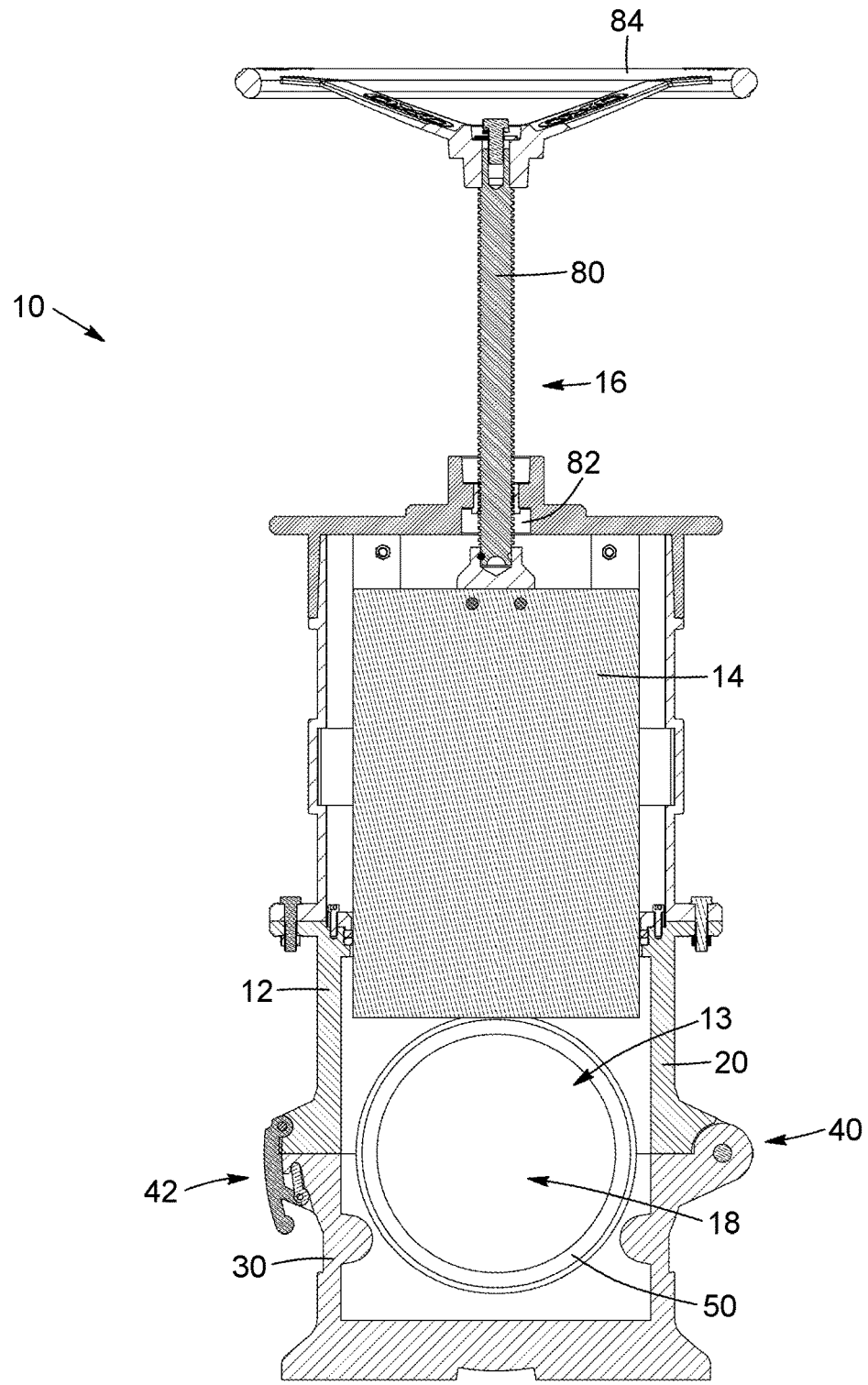
FIG. 6 is a cross sectional view of the knife gate valve of FIG. 1, taken along lines 6-6 in FIG. 5.
Figure 8:
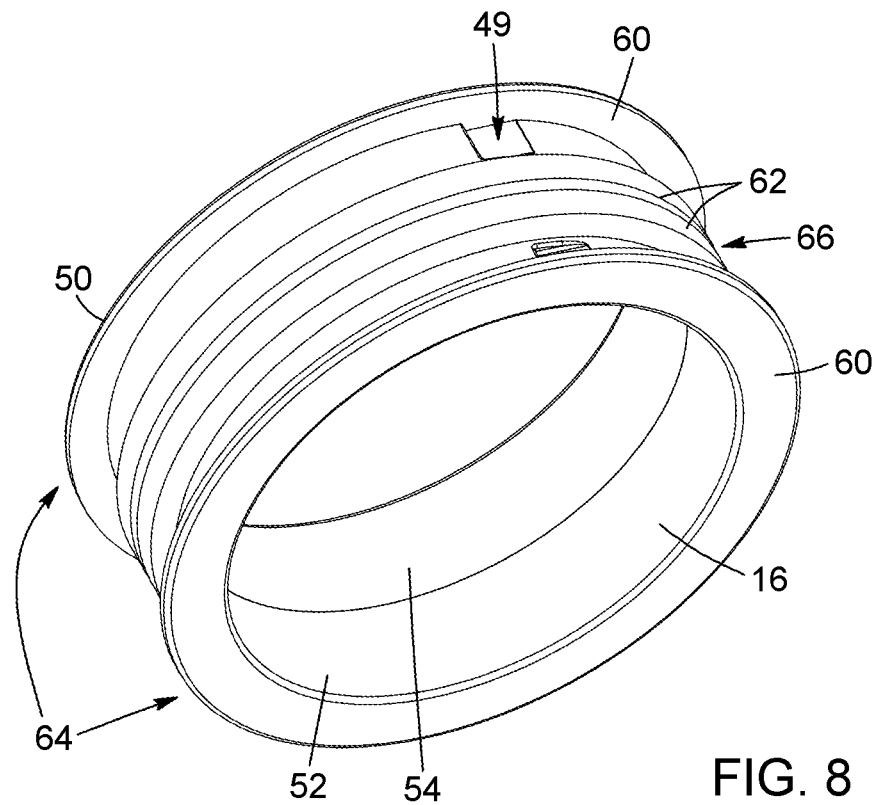
FIG. 8 is a perspective view of the two-part sleeve of the knife gate valve, in accordance with an embodiment.
Figure 9:
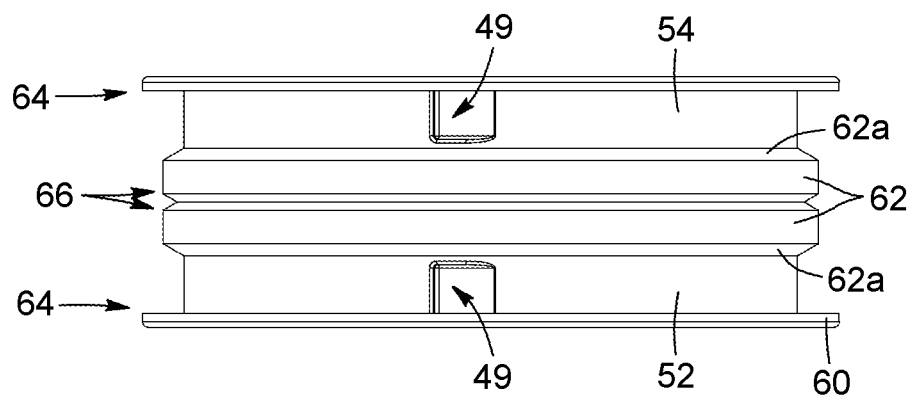
FIG. 9 is a top plan view of the two-part sleeve of FIG. 8.

Referring to FIGS. 4, 8 and 9, in an embodiment, the knife gate valve 10 also includes a sleeve engagement assembly 47 maintaining the two-part sleeve 50 in engagement with the upper casing section 20 when the upper casing section 20 and the lower casing section 30 are configured in the maintenance configuration (See FIG. 7B). In the embodiment shown, the sleeve engagement assembly 47 includes complementary abutting shoulders 48, 49 respectively defined in the cavity delimiting surface 26 of the upper casing section 20 (i.e. the cavity delimiting surface 26 of the upstream wall 70 and downstream wall 72 of the upper casing section 20) and in the outer surface of the tubular body 56 of the upstream section 52 and the downstream section 54 of the two-part sleeve 50. In FIG. 4, only the set of complementary abutting shoulders 48, 49 of the upstream wall 70 and upstream section 52 of the two-part sleeve 50 positioned proximate to the pivotal end 20a of the upper casing section 20 is shown, but one skilled in the art will understand that a similar set of complementary abutting shoulders 48, 49 is provided for the downstream wall 72 and downstream section 54 of the sleeve 50, proximate to the pivotal end 20a of the upper casing section 20. Moreover, similar sets of complementary abutting shoulders 48, 49 are provided for the upstream wall 70 and upstream section 52 of the sleeve 50 and the downstream wall 72 and downstream section 54 of the sleeve 50, proximate to the locking end 20b of the upper casing section 20. The resilient material of the two-part sleeve 50 allows momentary deformation of the outer surface of the tubular body 56 thereof to engage/disengage the complementary abutting shoulders 48, 49. In an embodiment, the sleeve engagement assembly 47 allows inner lips 62 of the two-part sleeve 50, which will be described in more details below, to be substantially horizontally aligned with corresponding sleeve engaging grooves 34 of the lower casing section 30, which will also be described in more details below, even when the upper casing section 20 and the lower casing section 30 are configured in the maintenance configuration.

One skilled in the art will understand that, in alternative embodiments (not shown), other sleeve engagement assemblies 47 or methods can also be provided to maintain the two-part sleeve 50 in engagement with the upper casing section 20, when the valve body 12 is configured in the maintenance configuration. For example and without being limitative, in an embodiment (not shown), at least one engagement pin can extend from the upstream wall 70 and the downstream wall 72 of the upper casing section 20 to engage in corresponding at least one engagement bores (not shown) of the upstream section 52 and the downstream section 54 of the two-part sleeve 50. In an embodiment, the at least one engagement bores can be defined in the outer lip 60, in an engagement tab (not shown) extending from the outer lip 60, or the like.

Moreover, in an alternative embodiment (not shown), the two-part sleeve 50 can be maintained in engagement with the lower casing section 30 when the valve body 12 is configured in the maintenance configuration with the sleeve engaging groove 34 being defined in the concave cavity 22 of the upstream wall 70 and the downstream wall 72 of the upper casing section 20. In such an embodiment, the sleeve engagement assembly could be configured to maintain the two-part sleeve 50 in engagement with the lower casing section 20, when the valve body 12 is configured in the maintenance configuration.

Referring to FIGS. 2, 3, 8 and 9, to compress the sleeve mating ends 66 of the tubular body 56 of the upstream section 52 and the downstream section 54 of the two-part sleeve 50 when the upper casing section 20 and the lower casing section 30 are configured in the operative configuration, in an embodiment, the knife gate valve 10 comprises a sleeve compression assembly 90. The sleeve compression assembly 90 is configured to exert a pressure on at least one of the upstream section 52 and the downstream section 54 of the two-part sleeve 50 when the upper casing section 20 and the lower casing section 30 are moved between the maintenance configuration and the operative configuration, such that the sleeve mating ends 66 of the tubular body 56 are pressed firmly against one another when the upper casing section 20 and the lower casing section 30 are configured in the operative configuration. In an embodiment, the sleeve compression assembly 90 of the knife gate valve 10 is further configured to release the pressure on the at least one of the upstream section 52 and the downstream section 54 when the upper casing section 20 and the lower casing section 30 are moved from the operative configuration to the maintenance configuration.

For example and without being limitative, in an embodiment, the sleeve compression assembly 90 includes a combination of features from the valve body 12 and the two-part sleeve 50 which cooperate to perform the above described compression/release of the upstream section 52 and the downstream section 54 of the two-part sleeve 50, during movement of the upper casing section 20 and the lower casing section 30 between the maintenance configuration and the operative configuration and vice-versa.

In the embodiment shown, each one of the upstream section 52 and the downstream section 54 of the two-part sleeve 50 has an outer lip 60 extending radially from the tubular body 56 at the body engaging end 64 and at least one inner lip 62 extending radially from the tubular body 56 and spaced apart from the outer lip 60. In the embodiment shown, the inner lip 62 extends radially from the tubular body 56, at the sleeve mating end 66. However, one skilled in the art will understand that, in an alternative embodiment (not shown), the inner lip 62 could extend radially from the tubular body 56, at an intermediate position between the body engaging end 64 and the sleeve mating end 66.

In the embodiment shown, the outer lip 60 is wider than the inner lip 62, i.e. the outer lip 60 extends further away from the tubular body 56 than the inner lip 62. Once gain, one skilled in the art will understand that, in alternative embodiments (not shown), the outer lip 60 can be substantially as wide as the inner lip 62 or the inner lip 62 can be larger than the outer lip 60. In the embodiment shown, the outer lip 60 is superposable to an outer surface of the respective one of the upstream wall 70 and the downstream wall 72 of the valve body 12 (i.e. an outer surface of the upper casing section 20 and the lower casing section 30), outwardly thereof.

In the embodiment shown, a sleeve engaging groove 24, 34 is defined between the upstream wall 70 and the downstream wall 72 of each one of the upper casing section and 20 and lower casing section 30. The sleeve engaging grooves 24, 34 extend inwardly from the cavity delimiting surface 26, 36 of the corresponding one of the upper casing section 20 and lower casing section 30 and are sized and shaped to receive therein a corresponding section of the inner lip 62 of the upstream section 52 and the downstream section 54 of the two-part sleeve 50. In the embodiment shown, the sleeve engaging grooves 24, 34 are defined between the inner surfaces 70a, 72a of the upstream wall 70 and the downstream wall 72 of the upper casing section 20 and lower casing section 30. In the embodiment shown, each one of the inner surfaces 70a, 72a of the upstream wall 70 and the downstream wall 72 includes a chamfered lip engaging surface 27, 37 (i.e. two opposed sections inwardly beveled and configured to at least partially engage with at least a portion of corresponding surfaces of the inner lip 62 of the upstream section 52 and the downstream section 54 of the two-part sleeve 50). In other words, in an embodiment, the sleeve engaging groove 24, 34 has a tapered configuration (or is inwardly angled) in at least a section thereof. In an embodiment, the angle of the chamfered lip engaging surfaces 27, 37 ranges between about 20 and about 70 degrees with regard to the vertical axis X. In another embodiment, the angle of the chamfered lip engaging surfaces 27, 37 ranges between about 30 and about 60 degrees with regard to the vertical axis X. One skilled in the art will understand that, in alternative embodiments (not shown), the lip engaging surfaces 27, 37 could extend over substantially the entire length of the inner surfaces 70a, 72a of the upstream wall 70 and the downstream wall 72 of the upper casing section 20 and lower casing section 30 defining the sleeve engaging groove 24, 34, therefore being a fully beveled surface (i.e. a surface inwardly angled along the entire length) rather than a chamfered surface.

In the embodiment shown, the inner lip 62 of the upstream section 52 and the downstream section 54 of the sleeve 50 is insertable in the sleeve engaging grooves 24, 34 when the upper casing section 20 and the lower casing section 30 are configured in the operative configuration, such that the sleeve mating ends 66 of the upstream section 52 and the downstream section 54 of the two-part sleeve 50 are pressed towards one another when the inner lip 62 is inserted in the sleeve engaging grooves 24, 34. In the embodiment shown, the engagement surfaces 62a of the inner lip 62 of the upstream section 52 and the downstream section 54 of the sleeve 50 are also inwardly beveled (i.e. angled inwardly). In an embodiment, the angle of the engagement surfaces 62a of the inner lip 62 of the upstream section 52 and the downstream section 54 of the two-part sleeve 50 substantially matches the angle of the corresponding lip engaging surfaces 27, 37. In an alternative embodiment, the angle of the engagement surfaces 62a of the inner lip 62 of the upstream section 52 and the downstream section 54 of the two-part sleeve 50 can be smaller than the angle of the corresponding lip engaging surfaces 27, 37.

The lip engaging surfaces 27, 37 and the engagement surfaces 62a of the inner lip 62 of the upstream section 52 and the downstream section 54 of the sleeve 50 are positioned and configured such that, when the inner lip 62 is inserted into the corresponding one of the sleeve engaging grooves 24, 34, the engagement therebetween results in at least a section of the upstream section 52 and the downstream section 54 of the sleeve 50 being driven towards one another and therefore press the sleeve mating ends 66 of the tubular body 56 against one another. For example and without being limitative, in an embodiment, a distance between a section of the outer surface of at least one of the upstream wall 70 and the downstream wall 72 and a vertically aligned section of the associated lip engaging surfaces 27, 37 is smaller than a corresponding distance between a section of an inner surface of the outer lip 60 and a vertically aligned section of the engagement surface 62*a* of the inner lip 62 of the corresponding one of the upstream section 52 and the downstream section 54 of the two-part sleeve 50, the two vertically aligned sections being substantially vertically aligned when the upstream section 52 and the downstream section 54 are configured in the operative configuration, with the two-part sleeve 50 in place.

Hence, in the embodiment shown, when the upper casing section 20 and the lower casing section 30 are moved from the maintenance configuration to the operative configuration, engagement of the section of the inner lip 62 of the upstream section 52 and the downstream section 54 of the sleeve 50 in the sleeve engaging grooves 24, 34, causes the upstream section 52 and the downstream section 54 of the sleeve 50 to move towards one another and results in the sleeve mating ends 66 of the tubular body 56 being pressed against one another. Conversely, the pressure between the upstream section 52 and the downstream section 54 of the sleeve 50 when the upper casing section 20 and the lower casing section 30 are moved from the operative configuration to the maintenance configuration is released.

One skilled in the art will understand that, in an alternative embodiment (not shown), the sleeve engaging groove 24, 34 could be defined in only one of the upper casing section 20 and lower casing section 30, the other one of the upper casing section 20 and lower casing section 30 being free from sleeve engaging groove 24, 34. In another alternative embodiment, only one of the inner surfaces 70*a*, 72*a* of the upstream wall 70 or the downstream wall 72 of the upper casing section 20 and/or the lower casing section 30 could include an angled lip engaging surface 27, 37 engageable with a corresponding engagement surfaces 62*a* of the inner lip 62 of the upstream section 52 or the downstream section 54 of the two-part sleeve 50 to perform the pressing of the sleeve mating ends 66 of the tubular body 56 when the upper casing section 20 and the lower casing section 30 are moved from the maintenance configuration to the operative configuration. Moreover, multiple sleeve engaging grooves 24, 34 could be defined in each one of the upper casing section 20 and/or the lower casing section 30 with corresponding multiple inner lips 62 defined in the upstream section 52 or the downstream section 54 of the two-part sleeve 50.

In view of the above, in the embodiment shown, the sleeve engaging groove 24, 34 defined by the inner surfaces 70*a*, 72*a* of the upstream wall 70 and the downstream wall 72 and including the inwardly beveled lip engaging surfaces 27, 37, in combination with the inwardly beveled engagement surfaces 62*a* of the inner lip 62 of the upstream section 52 and the downstream section 54 together define the sleeve compression assembly 90. One skilled in the art will however understand that, in alternative embodiments (not shown), other components, assembly and/or cooperation therebetween can be used to implement the sleeve compression assembly 90 performing the compression of the upstream section 52 and the downstream section 54 of the sleeve 50 when the transition between the maintenance configuration and the operative configuration occurs and the release of the compression of the upstream section 52 and the downstream section 54 when the transition between the operative configuration and the maintenance configuration occurs. In an alternative embodiment (not shown), the tubular body 56 of the upstream section 52 and the downstream section 54 of the two-part sleeve 50 can include an inner groove rather than an inner lip 62 while the cavities 22, 32 of the upper casing section 20 and the lower casing section 30 can include corresponding sleeve engagement lips rather than sleeve engagement grooves 34, or any other combination thereof.

Figure 3:
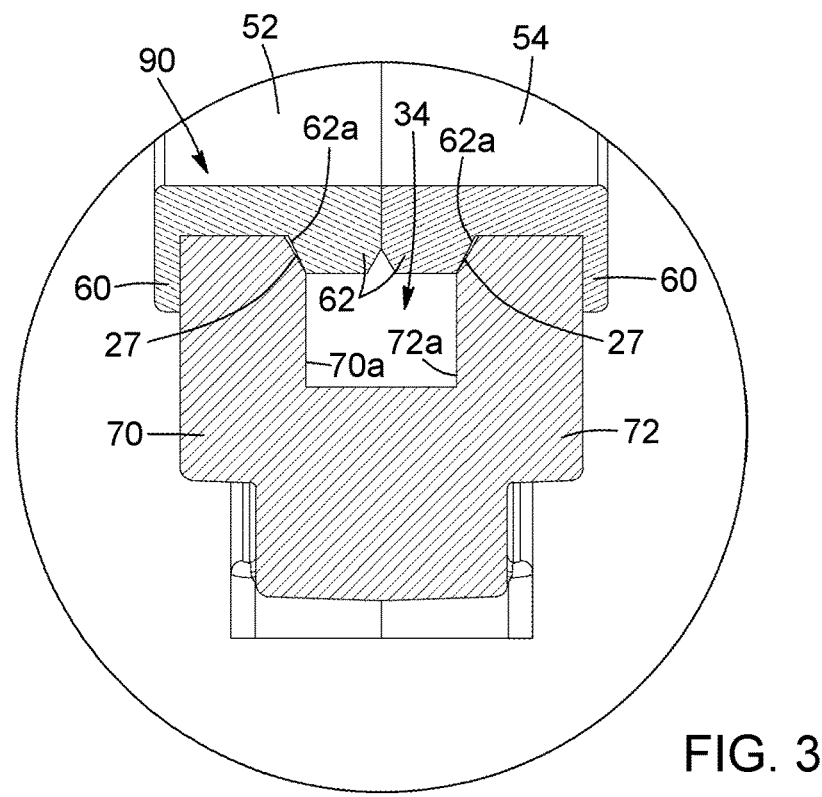
FIG. 3 is an enlarged view of a lower portion of the knife gate valve of FIG. 1, corresponding to section 3 of FIG. 2.
Figure 3A:
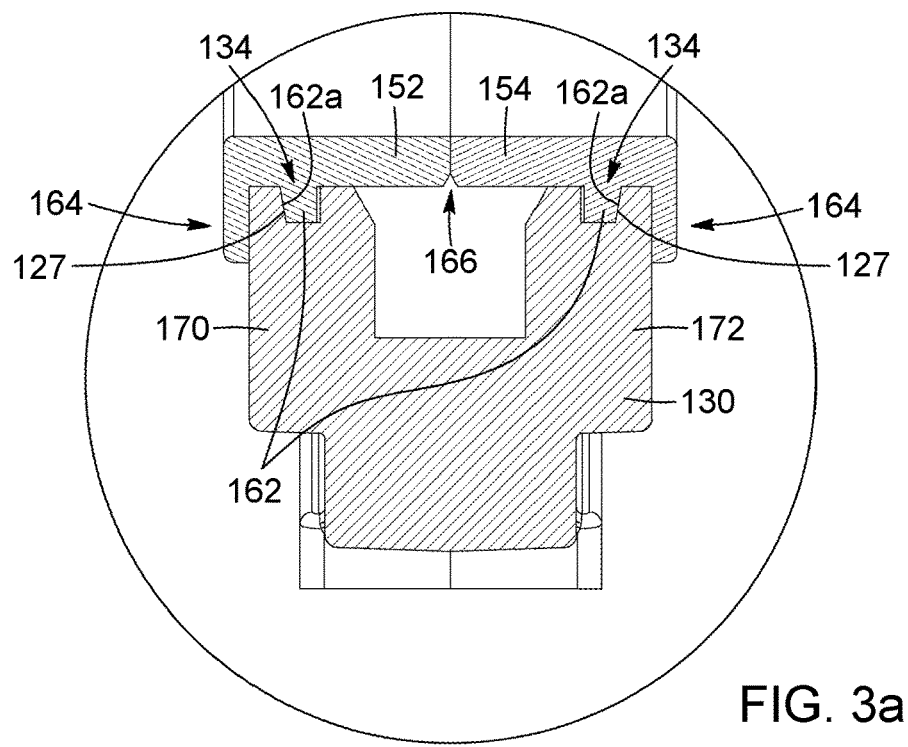
FIG. 3A is a cross sectional view of a section of a knife gate valve similar to the section shown in FIG. 3, in accordance with an alternative embodiment, wherein the sleeve compression assembly includes sleeve engaging grooves in each one of an upstream wall and a downstream wall of a valve body.

With reference to FIG. 3A, there is shown an alternative embodiment wherein similar features are numbered using the same reference numerals in the 100 series. In this alternative embodiment sleeve engaging grooves 134 are defined in the upstream wall 170 and/or the downstream wall 172 of the lower casing section 130. One skilled in the art will understand that similar sleeve engaging grooves could also be defined in the upstream wall and/or the downstream wall of the upper casing section (not shown). Hence, one skilled in the art will therefore understand that, in alternative embodiments, the sleeve engaging grooves 134 could be defined in the upstream wall 170 and/or the downstream wall 172 of the upper casing section (not shown) and/or the lower casing section 130 (i.e. between an outer and an inner surface thereof) rather than between the upstream wall 170 and the downstream wall 172. In such an alternative embodiment, the sleeve engaging grooves 134 could be sized and shaped to receive therein a corresponding section of the inner lip 162 of the corresponding one of the upstream section 152 and the downstream section 154 of the sleeve 150, for example and without being limitative, being located at an intermediate position between the body engaging end 164 and the sleeve mating end 166 thereof. In such an alternative embodiment, the sleeve engaging grooves, 124, 134 of the upstream wall 170 and/or the downstream wall 172 of the upper casing section 120 and/or the lower casing section 130 could have a lip engaging surface 127 inwardly beveled (or inwardly angled), such that engagement of an engagement surface 162*a* of the section of the inner lip 162 of the upstream section 152 and/or the downstream section 154 of the sleeve 150 in the sleeve engaging grooves 124, 134 would result in the upstream section 152 and the downstream section 154 of the sleeve 150 moving towards one another when the upper casing section 120 and the lower casing section 130 are configured in the maintenance configuration and, consequently, the sleeve mating ends 166 of the tubular body 156 being pressed against one another.

For ease of description, only the reference numerals in the 10 series will be used in the remaining of the description below.

Referring to FIGS. 7A to 7C, in an embodiment, further compression/release of the upstream section 52 and the downstream section 54 of the sleeve 50 can occur as a result of the mounting/dismounting of external conduits (not shown) to the valve body 12 of the knife gate valve 10. In other words, subsequently to a pre-compression of the upstream section 52 and the downstream section 54 of the sleeve 50 during the transition between the maintenance configuration and the operative configuration (as described above), a further compression thereof can occur as a result of the external conduits being mounted to the valve body 12 and further compressing the upstream section 52 and the downstream section 54 towards one another. Inversely, an initial release of a portion of the compression of the upstream section 52 and the downstream section 54 of the sleeve 50 can result from the external conduits being dismounted from the valve body 12 to allow subsequent transition between the operative configuration and maintenance configuration.

In order to allow such mounting/dismounting of the external conduits, the upstream wall 70 and the downstream wall 72 of the valve body 12 includes fixation apertures 76 defined therein for the mounting of the external conduits (not shown) in fluid engagement with the sleeve 50, on both sides of the valve body 12. For example and without being limitative, the external conduits can be mounted to the valve body 12 using mechanical fasteners such as bolts, nuts, or the like.

In the embodiment shown, the knife gate valve 10 also includes a push rod assembly 96 including push rods 97 selectively extendable from the outer surface of each one of the upstream wall 70 and the downstream wall 72. In other words, the push rods 97 are movable between a retracted configuration (see FIG. 7A) where they do not substantially project from the outer surface of the upstream wall 70 and the downstream wall 72 and an extended configuration (see FIG. 7B) where they extend substantially perpendicularly from the outer surface of the upstream wall 70 and the downstream wall 72. In an embodiment, a section of the push rods 97 of the push rod assembly 96 is accessible through a push rod 97 operating aperture 98 defined in the valve body 12, to move the corresponding one of the push rods 97 between the retracted configuration and the extended configuration. In an embodiment, each one of the push rods 97 is screwed in the valve body 12. One skilled in the art will understand that, in operation, the push rods 97 are therefore configured in the retracted configuration when the external conduits (not shown) are mounted to the valve body 12. When at least a portion of the external conduits (not shown) is dismounted from the valve body 12, in order to perform maintenance, the push rods 97 can be moved to the extended configuration, thereby exerting a pressure on the flanges of the external conduits (not shown) to part them from the corresponding one of the upstream wall 70 and the downstream wall 72, and at least contributing to prevent the outer lips 60 of the sleeve 50 from being trapped between the outer surface of the corresponding one of the upstream wall 70 and the downstream wall 72 and the flange of the corresponding external conduit (not shown), and thereby allowing the upper casing section 20 and the lower casing section 30 to be moved to the maintenance configuration.

One skilled in the art will understand that, in the embodiment shown, the sleeve 50 is not bolted to the valve body 12. However, in an alternative embodiment, the sleeve 50 can be bolted to the valve body 12 when the valve body 12 is configured in the operative configuration. In another alternative embodiment, a section of the sleeve 50 can be bolted to the valve body 12 when the valve body 12 is configured in the maintenance configuration.

In an embodiment, a locking mechanism 42 is provided for locking the upper casing section 20 and the lower casing section 30 together in the operative configuration. The locking mechanism 42 engages the upper casing section 20 and the lower casing section 30 at their respective locking ends 20b, 30b and is configurable in a locked configuration (shown in FIG. 1) where it maintains the upper casing section 20 and the lower casing section 30 in engagement with one another (i.e. in the operative configuration) and an unlocked configuration (shown in FIG. 7B) where it allows the upper casing section 20 and the lower casing section 30 to be pivoted away from one another (i.e. towards the maintenance configuration). In the embodiment shown, the locking mechanism 42 includes a tab 44 mounted to the lower casing section 30 and a handle 46, adapted to lock on the tab 44 and mounted to the upper casing section 20. One skilled in the art will understand that, in an alternative embodiment, the tab 44 can be mounted to the upper casing section 20, while the handle 46 is mounted to the lower casing section 30. Moreover, in an alternative embodiment, a locking mechanism 42 different from the one of the embodiment shown can also be provided.

In the embodiment shown, the lower casing section 30 can be detachably mounted to a support (not shown), such as a floor, a frame, and the like. In other words, the lower casing section 30 can be installed in a fixed position, with the upper casing section 20 pivotable thereabout (see FIG. 2) to move from the operative configuration to the maintenance configuration. One skilled in the art will however understand that, in alternative embodiments, the upper casing section 20 can be installed in the fixed position with the lower casing section 30 being pivotable thereabout. In yet another alternative embodiment, both the upper casing section 20 and the lower casing section 30 can be movable.

In an embodiment, a sealing assembly (not shown) is provided for sealing the valve body 12 when configured in the operative configuration. For example and without being limitative, in an embodiment (now shown), the sealing assembly can include a combination of a groove defined in one of the engagement surfaces 21, 31 and a corresponding tongue extending from the other one of the engagement surfaces 31 with sealing members sealing the connection therebetween. One skilled in the art will understand that in alternative embodiments, other sealing assemblies sealing other sections of the valve can also be provided to seal the valve body 12 when configured in the operative configuration.

Figure 10:
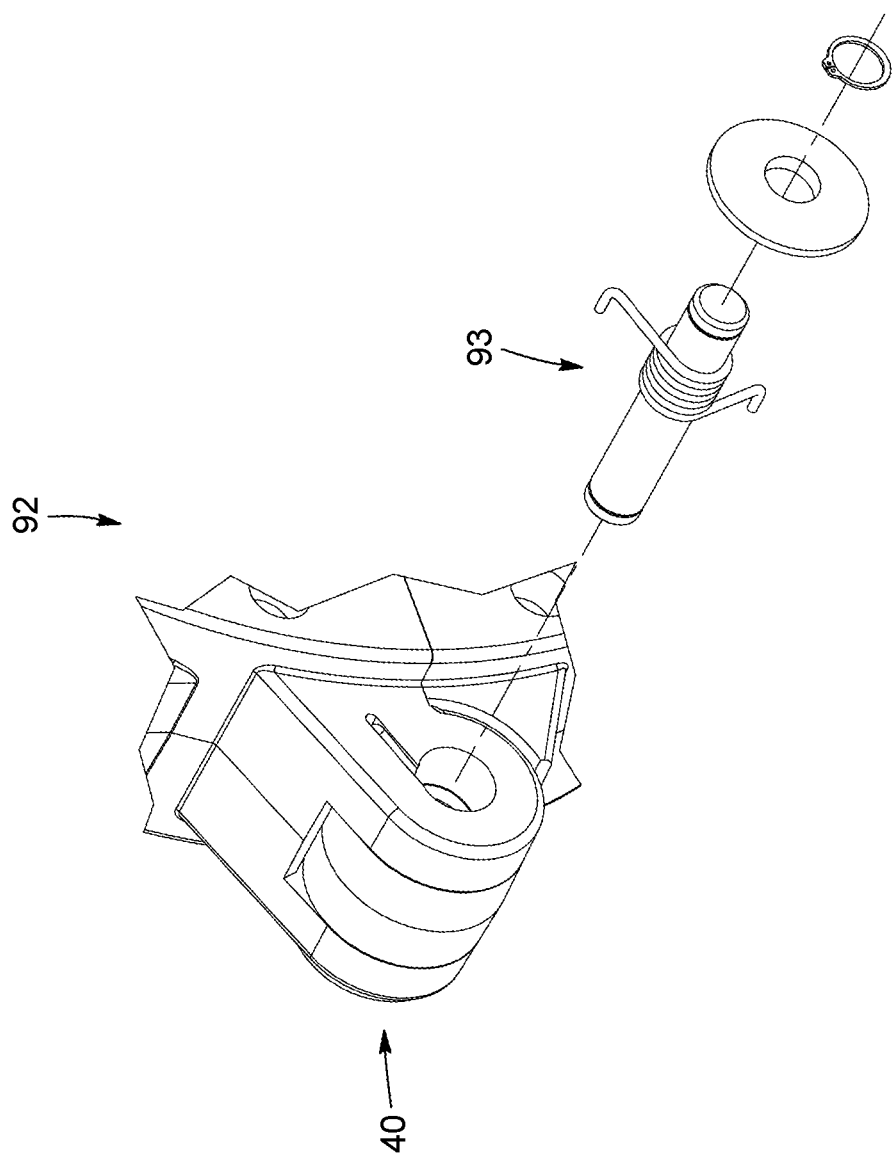
FIG. 10 is an exploded view of a pivoting section of the knife gate valve of FIG. 1, wherein the components of a movement restraint assembly are shown.

Referring to FIG. 10, in an embodiment, the knife gate valve 10 also includes a movement restraint assembly 92 configured to dampen the pivoting movement between the upper casing section 20 and the lower casing section 30 when they are pivoted regarding one another, to be moved from the operative configuration to the maintenance configuration. In the embodiment shown, the movement restraint assembly 92 is configured to at least partially counterbalance the inertia of the upper casing section 20 being pivoted and hence facilitates the manipulation of the upper casing section 20 during maintenance procedures. In the embodiment shown, the movement restraint assembly 92 includes a spring-loaded mechanism 93 inserted in the pivot 40 between the upper casing section 20 and the lower casing section 30. One skilled in the art will however understand that, in an alternative embodiment (not shown), other components different from the spring-loaded mechanism 93 could be provided. For example and without being limitative, in an alternative embodiment, not shown, the movement restraint assembly 92 could include a pneumatic cylinder, a hydraulic cylinder or any other mechanical, pneumatic or hydraulic component or the like.

In view of the above, one skilled in the art will understand that the combination of the pivotable upper casing section 20 and the lower casing section 30 of the valve body and the sleeve compression assembly 90 favors easy replacement of the sleeve 50. In an embodiment, such design allows the sleeve 50 to be replaced directly on site, while the valve 10 remains mounted in its original environment.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A knife gate valve comprising:
   a knife valve gate;
   a gate actuation mechanism operatively connected to the knife valve gate;
   a removable two-part sleeve comprising an upstream section and a downstream section each having a tubular body, the knife valve gate being selectively insertable between the upstream section and the downstream section thereof; and
   a valve body comprising an upper casing section and a lower casing section pivotally connected to one another, the upper casing section and the lower casing section each including a concave cavity delimited by a concave cavity delimiting surface and together defining a sleeve receiving channel of the valve body, the removable two-part sleeve being removably engageable in the sleeve receiving channel, the upper casing section and the lower casing section being pivotable between an operative configuration preventing removal of the removable two-part sleeve from the sleeve receiving channel and a maintenance configuration allowing insertion and removal of the removable two-part sleeve from the sleeve receiving channel.

2. The knife gate valve of claim 1, further comprising a sleeve compression assembly configured to press sleeve mating ends of the upstream section and the downstream section of the two-part sleeve towards one another when the upper casing section and the lower casing section are configured in the operative configuration.

3. The knife gate valve of claim 2, wherein the sleeve compression assembly comprises:
   a sleeve engaging groove extending inwardly from the concave cavity delimiting surface in at least one of the upper casing section and the lower casing section, the sleeve engaging groove defining at least one lip engaging surface; and
   an inner lip extending radially from the tubular body of at least one of the upstream section and the downstream section of the two-part sleeve, the inner lip including an engagement surface engageable to a corresponding one of the at least one lip engaging surface defined by the sleeve engaging groove and being insertable in the sleeve engaging groove when the upper casing section and the lower casing section are configured in the operative configuration, the sleeve mating ends of the upstream section and the downstream section of the two-part sleeve being pressed towards one another when the inner lip is inserted in the sleeve engaging groove.

4. The knife gate valve of claim 3, wherein each one of the upper casing section and the lower casing section comprises an upstream wall and a downstream wall, the sleeve engaging groove being defined between the upstream wall and the downstream wall of the at least one of the upper casing section and the lower casing section.

5. The knife gate valve of claim 4, wherein the sleeve engaging groove comprises two opposed lip engaging surfaces being inwardly beveled, the inner lip extending radially from the tubular body of each one of the upstream section and the downstream section of the two-part sleeve and being positioned at the sleeve mating ends of each one of the upstream section and the downstream section of the two-part sleeve.

6. The knife gate valve of claim 3, wherein the at least one lip engaging surface defined by the sleeve engaging groove is inwardly beveled.

7. The knife gate valve of claim 3, wherein the engagement surface of the inner lip is inwardly beveled.

8. The knife gate valve of claim 1, wherein the tubular body of the upstream section and the downstream section of the two-part sleeve comprises an outer lip extending radially from the tubular body at a body engaging end, the outer lip being superposable to an outer surface of the upper casing section and the lower casing section when the upper casing section and the lower casing section are configured in the operative configuration.

9. The knife gate valve of claim 1, further comprising a sleeve engagement assembly maintaining the two-part sleeve in engagement with one of the upper casing section and the lower casing section when the upper casing section and the lower casing section are configured in the maintenance configuration, the sleeve engagement assembly comprising complementary abutting shoulders respectively defined in the cavity delimiting surface of the upper casing section and in the outer surface of the tubular body of the upstream section and the downstream section of the two-part sleeve.

10. The knife gate valve of claim 1, further comprising a pivot between the upper casing section and the lower casing section and a movement restraint assembly configured to dampen the pivoting movement between the upper casing section and the lower casing section when they are pivoted regarding one another, the movement restraint assembly comprising a spring-loaded mechanism dampening the movement of the pivot.

11. A knife gate valve comprising:
    a two-part sleeve comprising an upstream section and a downstream section, each having a tubular body, the two-part sleeve defining a pathway for fluid flow;
    a knife valve gate configurable between an open configuration where it is located away from the pathway and a closed configuration where it extends across the pathway;
    a gate actuation mechanism operatively connected to the knife valve gate to move the knife valve gate between the open configuration and the closed configuration; and
    a valve body comprising an upper casing section and a lower casing section pivotally connected to one another and pivotable between an operative configuration and a maintenance configuration, the upper casing section and the lower casing section being configured to receive the two-part sleeve therebetween, the two-part sleeve being securely maintained between the upper casing section and the lower casing section, with the pathway being substantially sealed, when the upper casing section and the lower casing section are configured in the operative configuration and the two-part sleeve being partially disengaged from one of the upper casing section and the lower casing section and being substantially unsealed when they are configured in the maintenance configuration.

12. The knife gate valve of claim 11, wherein the upper casing section and the lower casing section each include a concave cavity delimited by a concave cavity delimiting surface and together defining a sleeve receiving channel of the valve body, the two-part sleeve being removably engageable in the sleeve receiving channel.

13. The knife gate valve of claim 12, further comprising a sleeve compression assembly configured to press sleeve mating ends of the upstream section and the downstream section of the two-part sleeve towards one another when the upper casing section and the lower casing section are configured in the operative configuration.

14. The knife gate valve of claim 13, wherein the sleeve compression assembly comprises:
  a sleeve engaging groove extending inwardly from the concave cavity delimiting surface in at least one of the upper casing section and the lower casing section, the sleeve engaging groove defining at least one lip engaging surface; and
  an inner lip extending radially from the tubular body of at least one of the upstream section and the downstream section of the two-part sleeve, the inner lip including an engagement surface engageable to a corresponding one of the at least one lip engaging surface defined by the sleeve engaging groove and being insertable in the sleeve engaging groove when the upper casing section and the lower casing section are configured in the operative configuration, the sleeve mating ends of the upstream section and the downstream section of the two-part sleeve being pressed towards one another when the inner lip is inserted in the sleeve engaging groove.

15. The knife gate valve of claim 14, wherein each one of the upper casing section and the lower casing section comprises an upstream wall and a downstream wall, the sleeve engaging groove being defined between the upstream wall and the downstream wall of the at least one of the upper casing section and the lower casing section.

16. The knife gate valve of claim 15, wherein the sleeve engaging groove comprises two opposed lip engaging surfaces being inwardly beveled, the inner lip extending radially from the tubular body of each one of the upstream section and the downstream section of the two-part sleeve and being positioned at the sleeve mating ends of each one of the upstream section and the downstream section of the two-part sleeve.

17. The knife gate valve of claim 14, wherein the at least one lip engaging surface defined by the sleeve engaging groove is inwardly beveled.

18. The knife gate valve of claim 12, further comprising a sleeve engagement assembly maintaining the two-part sleeve in engagement with one of the upper casing section and the lower casing section when the upper casing section and the lower casing section are configured in the maintenance configuration, the sleeve engagement assembly comprising complementary abutting shoulders respectively defined in the cavity delimiting surface of the upper casing section and in the outer surface of the tubular body of the upstream section and the downstream section of the two-part sleeve.

19. The knife gate valve of claim 14, wherein the engagement surface of the inner lip is inwardly beveled.

20. The knife gate valve of claim 11, wherein the tubular body of the upstream section and the downstream section of the two-part sleeve comprises an outer lip extending radially from the tubular body at a body engaging end, the outer lip being superposable to an outer surface of the upper casing section and the lower casing section when the upper casing section and the lower casing section are configured in the operative configuration.

21. The knife gate valve of claim 11, further comprising a pivot between the upper casing section and the lower casing section and a movement restraint assembly configured to dampen the pivoting movement between the upper casing section and the lower casing section when they are pivoted regarding one another, the movement restraint assembly comprising a spring-loaded mechanism dampening the movement of the pivot.

* * * * *